United States Patent
Christensen et al.

(10) Patent No.: US 8,433,471 B2
(45) Date of Patent: Apr. 30, 2013

(54) PRE-FILLING VEHICLE DATA CHECK

(75) Inventors: Jeffrey P. Christensen, Clinton Township, MI (US); Michael D. Solomon, Novi, MI (US); Carl J. Hering, Farmington Hills, MI (US); Ryan M. Edwards, Macomb, MI (US)

(73) Assignee: General Motors LLC, Detroit, MI (US)

( * ) Notice: Subject to any disclaimer, the term of this patent is extended or adjusted under 35 U.S.C. 154(b) by 332 days.

(21) Appl. No.: 12/782,693

(22) Filed: May 18, 2010

(65) Prior Publication Data

US 2011/0288721 A1    Nov. 24, 2011

(51) Int. Cl.
*G06F 17/00* (2006.01)
*G06Q 20/00* (2012.01)

(52) U.S. Cl.
USPC ....... 701/29.1; 701/29.3; 701/29.4; 701/32.3; 701/33.4; 705/16; 705/413

(58) Field of Classification Search ............... 701/29.1, 701/29.3, 29.4, 29.6, 31.4, 32.3, 32.4, 33.4, 701/33.5, 34.2, 123; 705/16, 412, 413
See application file for complete search history.

(56) References Cited

U.S. PATENT DOCUMENTS

| | | |
|---|---|---|
| 5,956,259 A | 9/1999 | Hartsell, Jr. et al. |
| 6,073,840 A | 6/2000 | Marion |
| 6,089,284 A | 7/2000 | Kaehler et al. |
| 6,390,151 B1 * | 5/2002 | Christman et al. ............ 141/231 |
| 6,422,464 B1 | 7/2002 | Terranova |
| 6,594,579 B1 * | 7/2003 | Lowrey et al. ................. 701/123 |
| 7,082,406 B1 * | 7/2006 | Dickson .......................... 705/24 |
| 7,469,826 B2 | 12/2008 | Ciancio et al. |
| 7,478,747 B2 * | 1/2009 | Call et al. ....................... 235/375 |
| 7,640,185 B1 | 12/2009 | Giordano et al. |
| 7,725,351 B1 * | 5/2010 | Williams ........................ 705/16 |
| 2003/0200108 A1 * | 10/2003 | Malnoe .............................. 705/1 |
| 2005/0192832 A1 | 9/2005 | Call et al. |
| 2006/0012479 A1 * | 1/2006 | Ezra ........................... 340/572.1 |
| 2007/0173993 A1 * | 7/2007 | Nielsen et al. .................. 701/35 |
| 2009/0150244 A1 | 6/2009 | Ciancio et al. |
| 2010/0265033 A1 * | 10/2010 | Cheung ......................... 340/5.64 |
| 2010/0274570 A1 * | 10/2010 | Proefke et al. ................. 705/1.1 |
| 2010/0306078 A1 * | 12/2010 | Hwang ......................... 705/26.1 |
| 2011/0060521 A1 * | 3/2011 | Watkins ......................... 701/213 |
| 2012/0022956 A1 * | 1/2012 | Payne et al. ..................... 705/16 |

\* cited by examiner

*Primary Examiner* — Drew Brown
*Assistant Examiner* — Barry Gooden, Jr.
(74) *Attorney, Agent, or Firm* — Dierker & Associates, P.C.

(57) ABSTRACT

A pre-filling vehicle data check method and system are disclosed herein. One example of the method includes receiving, at a financial institution, an authorization request from a filling station for initiating a filling event, where the authorization request includes a financial code. Via a computing device at the financial institution, the financial code is recognized as being associated with at least one of a vehicle identification number or a station identification associated with a vehicle, thereby identifying the vehicle. At least one parameter of the vehicle is identified via a computing device at a data center in selective communication with the vehicle and the financial institution, and an authorization or denial of the at least one filling event based at least upon the at least one parameter is transmitted from the computing device at the data center.

20 Claims, 4 Drawing Sheets

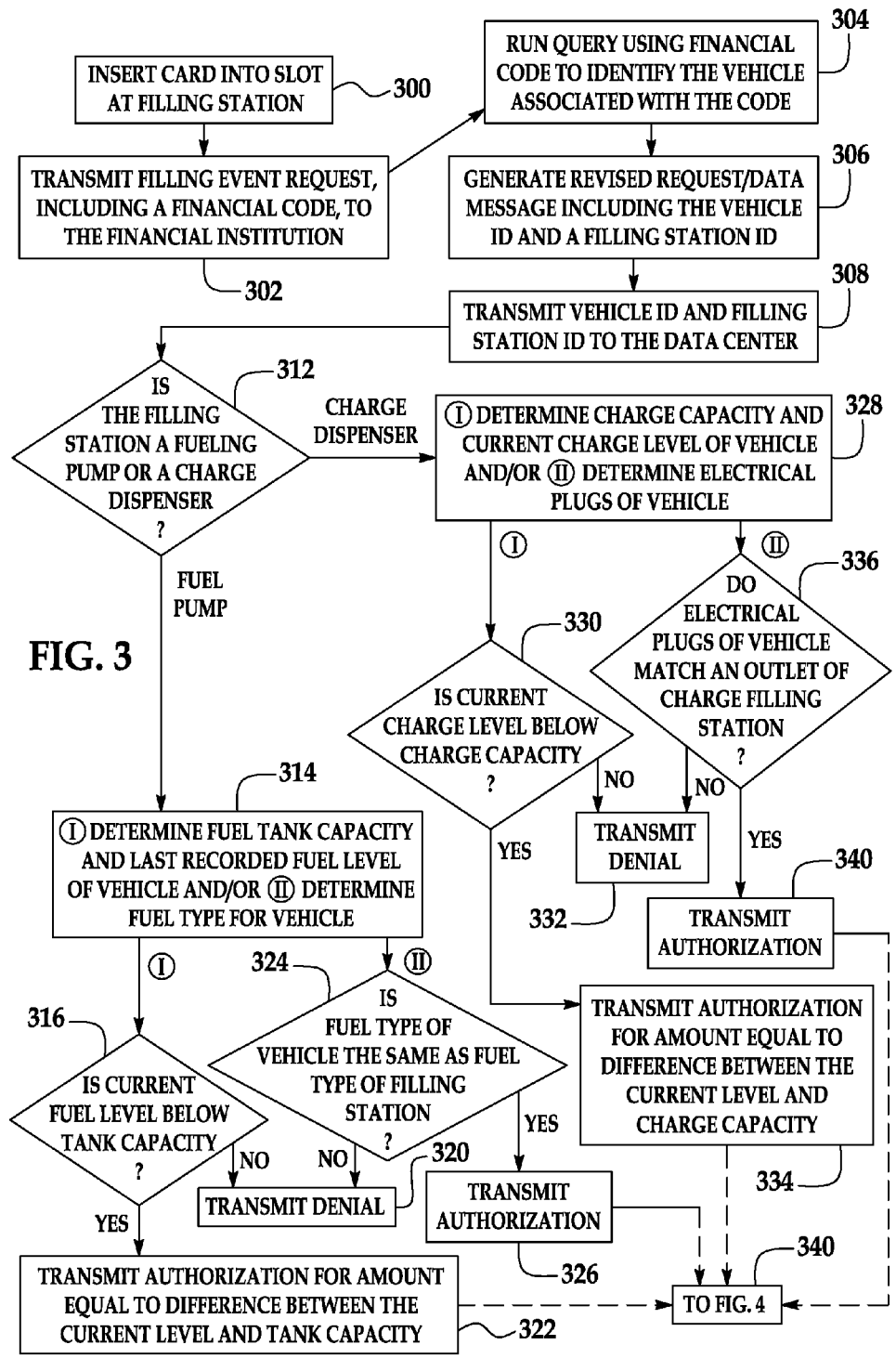

PRE-FILLING VEHICLE DATA CHECK

TECHNICAL FIELD

The present disclosure relates generally to a pre-filling vehicle data check method and a system for performing the pre-filling vehicle data check method.

BACKGROUND

Some fueling stations are equipped with communication electronics that are capable of uni- or bi-directionally communicating with a customer or a vehicle equipped with a communications devices. These stations communicate with the vehicle in order to precondition the pump for the particular customer or the particular vehicle.

SUMMARY

A pre-filling vehicle data check method and system are disclosed herein. One example of the method includes receiving, at a financial institution, an authorization request from a filling station for initiating a filling event, where the authorization request includes a financial code. Via a computing device at the financial institution, the financial code is recognized as being associated with at least one of a vehicle identification number or a station identification associated with a vehicle, thereby identifying the vehicle. At least one parameter of the vehicle is identified via a computing device at a data center, which is in selective communication with the vehicle and the financial institution, and an authorization or denial of the at least one filling event based at least upon the at least one parameter is transmitted from the computing device at the data center.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 3 is a flow diagram depicting examples of the method for performing the pre-filling data check;

DETAILED DESCRIPTION

Examples of the method disclosed herein may be used to run a pre-filling vehicle data check. The method disclosed herein utilizes data communication exchanges between a filling pump, a financial institution, and a back-end vehicle-dedicated data center to program one or more parameters of the filling pump for a filling event. As used herein, the term "filling event" refers to adding fuel to the fuel tank of a vehicle and/or charging the battery of a hybrid or electric vehicle, and the term "filling station" refers to the pump or other device used to dispense the fuel and/or electricity. The method disclosed herein does not involve the vehicle itself (unless the data center pings the vehicle to trigger an on-demand vehicle data upload event), but rather uses the back-end vehicle-dedicated data center to control the filling event. This method may proactively limit the amount of fuel and/or electricity that can be dispensed, proactively prohibit the use of incompatible fuel, proactively control the types of plugs and/or volts used, and prevent misuse of fleet vehicles (i.e., at least two vehicles owned by a single entity and operated by various drivers working for the single entity).

It is to be understood that, as used herein, the term "user" includes a vehicle owner, operator, and/or passenger. It is further to be understood that the term "user" may be used interchangeably with the term subscriber/service subscriber.

Additionally, the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Also, the term "communication" is to be construed to include all forms of communication, including direct and indirect communication. As such, indirect communication may include communication between two components with additional component(s) located therebetween.

Figure 1:
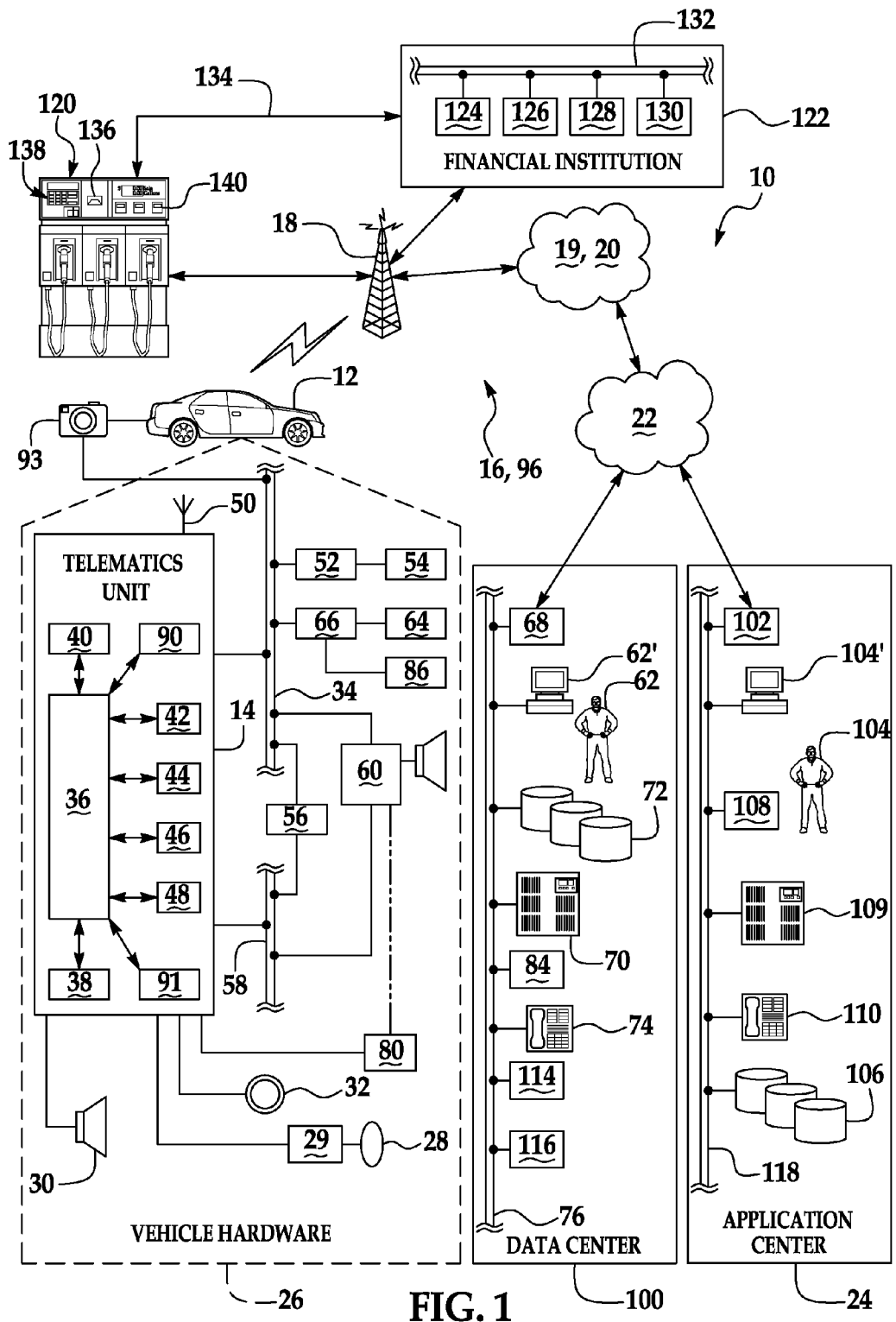
FIG. 1 is a schematic diagram depicting an example of a pre-filling vehicle data check system.

Referring now to FIG. 1, the system 10 includes the vehicle 12, the telematics unit 14, a carrier/communication system 16 (which may include wired or wireless components, including, but not limited to, one or more cell towers 18, one or more base stations 19 and/or mobile switching centers (MSCs) 20, and one or more service providers (not shown)), one or more land networks 22, one or more data centers 100, and one or more application centers 24 (which may also be referred to as an application specific call center), a filling station 120, and a financial institution 122.

The overall architecture, setup and operation, as well as many of the individual components of the system 10 shown in FIG. 1 are generally known in the art. Thus, the following paragraphs provide a brief overview of one example of such a system 10. It is to be understood, however, that additional components and/or other systems not shown here could employ the method(s) disclosed herein.

Vehicle 12 is a mobile vehicle (e.g., a fuel-run vehicle, a hybrid vehicle, or an electric vehicle) such as a motorcycle, car, truck, recreational vehicle (RV), boat, plane, etc., and is equipped with suitable hardware and software that enables it to communicate (e.g., transmit and/or receive voice and data communications) over the wireless carrier/communication system 16. It is to be understood that the vehicle 12 may also include additional components suitable for use in the telematics unit 14.

Some of the vehicle hardware 26 is shown generally in FIG. 1, including the telematics unit 14 and other components that are operatively connected to the telematics unit 14. Examples of the other hardware 26 components include a microphone 28, a speaker 30 and buttons, knobs, switches, keyboards, and/or controls 32. In an example, the microphone 28 is part of a voice module 29 that is configured to receive voice commands from, for example, the user. Generally, these hardware 26 components enable a user to communicate with the telematics unit 14 and any other system 10 components in communication with the telematics unit 14.

In an example, the vehicle hardware 26 also includes a camera 93. In an example, the camera 93 may be configured to generate images (e.g., photographs) of portions of the interior or the exterior of the vehicle 12 (depending, at least in part, on how/where the camera 93 is positioned inside the vehicle 12). In another example, the camera 93 may be configured to record a video of the interior and/or exterior portions of the vehicle 12. The camera 93 may be selected from stationary devices or rotating devices, and is used to generate images or videos.

Operatively coupled to the telematics unit 14 is a network connection or vehicle bus 34. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few. The vehicle bus 34 enables the vehicle 12 to send and receive signals from the telematics unit 14 to various units of equipment and systems both outside the vehicle 12 and within the vehicle 12 to perform various functions, such as unlocking a door, executing personal comfort settings, and/or the like. In an example, the vehicle bus 34 also enables the telematics unit 14 to receive vehicle data from the various units of equipment and systems of the vehicle 12. Vehicle data may include, but is not limited to, location-based data (e.g., a then-current location of the vehicle 12), infotainment data, video data or photographs taken, e.g., from the in-vehicle camera 93, data pertaining to vehicle operations (e.g., gas mileage, tire pressure, HVAC system operation, vehicle diagnostic information, urea levels, battery charge state, etc.), and/or the like.

The telematics unit 14 is an onboard device that provides a variety of services, both individually and through its communication with the data center 100 and/or application center 24. The telematics unit 14 generally includes an electronic processing device 36 operatively coupled to one or more types of electronic memory 38, a cellular chipset/component 40, a wireless modem 42, a navigation unit containing a location detection (e.g., global positioning system (GPS)) chipset/component 44, a real-time clock (RTC) 46, a short-range wireless communication network 48 (e.g., a BLUETOOTH® unit), and/or a dual antenna 50. In some cases, the telematics unit 14 further includes a recorder 90. In one example, the wireless modem 42 includes a computer program and/or set of software routines executing within processing device 36.

It is to be understood that the telematics unit 14 may be implemented without one or more of the above listed components, such as, for example, the short-range wireless communication network 48. It is to be further understood that telematics unit 14 may also include additional components and functionality as desired for a particular end use.

The electronic processing device 36 may be a micro controller, a controller, a microprocessor, a host processor, and/or a vehicle communications processor. In another example, electronic processing device 36 may be an application specific integrated circuit (ASIC). Alternatively, electronic processing device 36 may be a processor working in conjunction with a central processing unit (CPU) performing the function of a general-purpose processor.

The location detection chipset/component 44 may include a Global Position System (GPS) receiver, a radio triangulation system, a dead reckoning position system, and/or combinations thereof. In particular, a GPS receiver provides accurate time and latitude and longitude coordinates of the vehicle 12 responsive to a GPS broadcast signal received from a GPS satellite constellation (not shown).

The cellular chipset/component 40 may be an analog, digital, dual-mode, dual-band, multi-mode and/or multi-band cellular phone. The cellular chipset-component 40 uses one or more prescribed frequencies in the 800 MHz analog band or in the 800 MHz, 900 MHz, 1900 MHz and higher digital cellular bands. Any suitable protocol may be used, including digital transmission technologies such as TDMA (time division multiple access), CDMA (code division multiple access) and GSM (global system for mobile telecommunications). In some instances, the protocol may be short-range wireless communication technologies, such as BLUETOOTH®, dedicated short-range communications (DSRC), or Wi-Fi.

Also associated with electronic processing device 36 is the previously mentioned real time clock (RTC) 46, which provides accurate date and time information to the telematics unit 14 hardware and software components that may require and/or request this date and time information. In an example, the RTC 46 may provide date and time information periodically, such as, for example, every ten milliseconds.

The telematics unit 14 provides numerous services, some of which may not be listed herein, and is configured to fulfill one or more user or subscriber requests. Several examples of these services include, but are not limited to: turn-by-turn directions and other navigation-related services provided in conjunction with the GPS based chipset/component 44; airbag deployment notification and other emergency or roadside assistance-related services provided in connection with various crash and or collision sensor interface modules 52 and sensors 54 located throughout the vehicle 12; vehicle data upload sessions so that vehicle diagnostics can be performed remotely from the vehicle 12; and infotainment-related services where music, webpages, movies, television programs, videogames and/or other content is downloaded by an infotainment center 56 operatively connected to the telematics unit 14 via vehicle bus 34 and audio bus 58. In one non-limiting example, downloaded content is stored (e.g., in memory 38) for current or later playback.

Again, the above-listed services are by no means an exhaustive list of all the capabilities of telematics unit 14, but are simply an illustration of some of the services that the telematics unit 14 is capable of offering.

Vehicle communications generally utilize radio transmissions to establish a voice channel with carrier system 16 such that both voice and data transmissions may be sent and received over the voice channel. Vehicle communications are enabled via the cellular chipset/component 40 for voice communications and the wireless modem 42 for data transmission. In order to enable successful data transmission over the voice channel, wireless modem 42 applies some type of encoding or modulation to convert the digital data so that it can communicate through a vocoder or speech codec incorporated in the cellular chipset/component 40. It is to be understood that any suitable encoding or modulation technique that provides an acceptable data rate and bit error may be used with the examples disclosed herein. Generally, dual mode antenna 50 services the location detection chipset/component 44 and the cellular chipset/component 40.

The voice module 29, via the microphone 28, provides the user with a means for inputting verbal or other auditory commands, and can be equipped with an embedded voice processing unit utilizing human/machine interface (HMI) technology known in the art. Conversely, speaker 30 provides verbal output to the vehicle occupants and can be either a stand-alone speaker specifically dedicated for use with the telematics unit 14 or can be part of a vehicle audio component 60. In either event and as previously mentioned, microphone 28 and speaker 30 enable vehicle hardware 26, data center 100, and application center 24 to selectively communicate with the occupants through audible speech. The vehicle hardware 26 also includes one or more buttons, knobs, switches, keyboards, and/or controls 32 for enabling a vehicle occupant to activate or engage one or more of the vehicle hardware components. In one example, one of the buttons 32 may be an electronic pushbutton used to initiate voice connection/communication with the data center 100 (whether it be a live advisor 62 or an automated call response system 62') or with the application center 24 (also whether it be a live advisor 104 or an automated call response system 104'). As one example, one of the buttons 32 may be used to initiate emergency services.

The audio component 60 is operatively connected to the vehicle bus 34 and the audio bus 58. The audio component 60 receives analog information, rendering it as sound, via the audio bus 58. Digital information is received via the vehicle bus 34. The audio component 60 provides AM and FM radio, satellite radio, CD, DVD, multimedia and other like functionality independent of the infotainment center 56. Audio component 60 may contain a speaker system, or may utilize speaker 30 via arbitration on vehicle bus 34 and/or audio bus 58.

Still referring to FIG. 1, the vehicle crash and/or collision detection sensor interface 52 is/are operatively connected to the vehicle bus 34. The crash sensors 54 provide information to the telematics unit 14 via the crash and/or collision detection sensor interface 52 regarding the severity of a vehicle collision, such as the angle of impact and the amount of force sustained.

Other vehicle sensors 64, connected to various sensor interface modules 66 are operatively connected to the vehicle bus 34. Example vehicle sensors 64 include, but are not limited to, gyroscopes, accelerometers, magnetometers, emission detection and/or control sensors, environmental detection sensors, fuel level sensors, electrical charge sensors, and/or the like. One or more of the sensors 64 enumerated above may be used to obtain the vehicle data for use by the telematics unit 14 or the data center 100, for example, to determine the operation of the vehicle 12 and to maintain a then-current diagnostics profile of the vehicle 12. Non-limiting example sensor interface modules 66 include powertrain control, climate control, body control, and/or the like.

Once on-board vehicle sensor data is received at the telematics unit 14, such data may then be transmitted to the data center 100 during a voice connection in the form of packet data over a packet-switch network 96 (e.g., voice over Internet Protocol (VoIP), communication system 16, etc.). The telematics unit 14 may include a vehicle data upload (VDU) system 91, which is configured to receive raw vehicle data (e.g., collected by sensors 54, 64) from the bus 34, packetize the data, and upload the packetized raw data to the data center 100. As shown in FIG. 1, the VDU 91 is operatively connected to the processor 36 of the telematics unit 14, and thus is in communication with the data center 100 (and with the application center 24) via the bus 34 and the communication system 16. The VDU 91 may be the telematics unit's central data system that can include its own modem, processor, and on-board database. The database can be implemented using a separate network attached storage (NAS) device or be located elsewhere, such as in memory 38, as desired. The VDU 91 has an application program that handles all of the vehicle data upload processing, including communication with the data center 100 and the application center 24, and the setting and processing of triggers (i.e., preset indicators of when data is to be uploaded, e.g., predefined intervals, upon request from the data center 100, etc.).

In a non-limiting example, the vehicle hardware 26 also includes a display 80, which may be operatively directly connected to or in communication with the telematics unit 14, or may be part of the audio component 60. Non-limiting examples of the display 80 include a VFD (Vacuum Fluorescent Display), an LED (Light Emitting Diode) display, a driver information center display, a radio display, an arbitrary text device, a heads-up display (HUD), an LCD (Liquid Crystal Diode) display, and/or the like.

In an example, the carrier/communication system 16 is a two-way radio frequency communication system. More specifically, the carrier/communication system 16 may be a cellular telephone system or any other suitable wireless system that transmits signals between the vehicle hardware 26 and land network 22, and/or between the financial institution 122 and the land network 22. According to an example, wireless carrier/communication system 16 includes one or more cell towers 18, base stations 19 and/or mobile switching centers (MSCs) 20, as well as any other networking components required to connect the wireless system 16 with land network 22. It is to be understood that various cell tower/base station/MSC arrangements are possible and could be used with wireless system 16. For example, a base station 19 and a cell tower 18 may be co-located at the same site or they could be remotely located, and a single base station 19 may be coupled to various cell towers 18 or various base stations 19 could be coupled with a single MSC 20. A speech codec or vocoder may also be incorporated in one or more of the base stations 19, but depending on the particular architecture of the wireless network 16, it could be incorporated within an MSC 20 or some other network components as well.

Land network 22 may be a conventional land-based telecommunications network that is connected to one or more landline telephones and connects wireless carrier/communication network 16 to the data center 100 and/or to the application center 24. For example, land network 22 may include a public switched telephone network (PSTN) and/or an Internet protocol (IP) network. It is to be understood that one or more segments of the land network 22 may be implemented in the form of a standard wired network, a fiber or other optical network, a cable network, other wireless networks such as wireless local networks (WLANs) or networks providing broadband wireless access (BWA), or any combination thereof.

Data center 100 is designed to provide the vehicle hardware 26 and the filling station 120 with a number of different system back-end functions. Generally, the data center 100 receives voice and/or data calls, analyzes requests associated with the voice or data calls, and, in some cases, transfers the call to an application specific call/service center (e.g., the application center 24 shown in FIG. 1, which will be described in detail below). The data center 100 is also in selective and operative communication with the application center 24 via the wireless carrier/communication system 16 or via a wired connection. Additionally, for purposes of the instant disclosure, the data center 100 is in selected and operative communication with the telematics unit 14 and the financial institution 122. Through its communications with the financial institution 122, the data center 100 is also in communication with the filling station 120.

According to the example shown here, the data center 100 generally includes one or more switches 68, servers 70, databases 72, live and/or automated advisors 62, 62', a processor 84, various modules (e.g., a comparison module 114, a communications module 116), as well as a variety of other telecommunication and computer equipment 74 that is known to those skilled in the art. These various data center components are coupled to one another via a network connection or bus 76, such as one similar to the vehicle bus 34 previously described in connection with the vehicle hardware 26.

The processor 84, which is often used in conjunction with the computer equipment 74, is generally equipped with suitable software and/or programs configured to accomplish a variety of data center 100 functions. The processor 84 may further be configured to run programs for performing back-end functions in combination with the application center 24.

Switch 68, which may be a private branch exchange (PBX) switch, routes incoming signals so that voice transmissions are usually sent to either the live advisor 62 or the automated response system 62', and data transmissions are passed on to a modem or other piece of equipment (not shown) for demodulation and further signal processing. The modem preferably includes an encoder, as previously explained, and can be connected to various devices, such as the server 70 and database 72. In either instance, the entity (e.g., 62, 62' or modem) of the data center 100 receiving the transmission determines (by asking the caller or by analysis of the data) who/what is calling, the need/request of the calling entity, and where to further direct the call to obtain the desired assistance.

Figure 2:
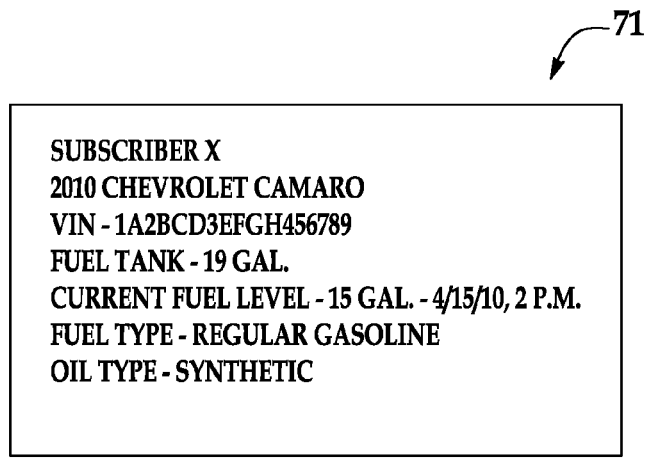
FIG. 2 is a schematic view of an example of a subscriber vehicle record stored at a data center.

It is to be understood the database(s) 72 may be designed to store subscriber profile records, subscriber vehicle records, subscriber behavioral patterns, or any other pertinent subscriber information. The subscriber vehicle record includes a variety of vehicle data, including vehicle identifying information (e.g., vehicle identification number (VIN) and/or station identification (STID)), the fuel tank capacity and/or the charge capacity of the vehicle 12, a time and date stamped reading of the fuel tank level and/or charge level received during the most recent vehicle data upload event, a suitable type of fuel for the vehicle 12 (if appropriate), electrical plugs of the vehicle (if appropriate), and/or various combinations thereof. An example of a subscriber vehicle record (labeled 71) is shown in FIG. 2.

The database(s) 72 may also allow the data center 100 to function as a repository for data collected from the telematics unit 14 and/or from the application center 24. In some instances, another facility may function as a repository for the collected data (e.g., a lab (not shown) associated with the application center 24 and/or the data center 100).

The comparison module 114 is configured with suitable hardware and software for receiving information from the financial institution 122 and from the subscriber vehicle profile 71 (see FIG. 2) and/or directly from the vehicle 12, and comparing set pre-set parameters (e.g., fuel tank capacity, charge capacity, fuel type for the vehicle 12) with varying parameters (e.g., current fuel level, current charge level, fuel type available at a particular filling station), and also comparing a filling station location with an actual vehicle location. The comparison module 114 transmits the results of these comparisons to the processor 84, which generates a filling event authorization or denial based upon the results. The processor 84 utilizes the communications module 116 to transmit an authorization or denial to the financial institution 122, which forwards the authorization or denial to the filling station 120.

As such, the communications module 116 is configured, via suitable communications equipment (such as equipment capable of handling messaging between the data center 100 and the telematics unit 14, modems, TCP/IP supporting equipment, and/or the like), to enable the data center 100 to establish a communication with the telematics unit 14, or visa versa, and/or with the financial institution 122, or visa versa. In an example, the communications module 116 is configured to initiate a packet session with the telematics unit 14. The packet session may, for example, be used by the data center 100 to request vehicle data from at least one vehicle system through the telematics unit 14. This vehicle data may be used, by the data center 100, to generate a filling event authorization or denial in response to a request received through the financial institution 122.

It is to be appreciated that the data center 100 may be any central or remote facility, manned or unmanned, mobile or fixed, to or from which it is desirable to exchange voice and data communications. Furthermore, the live advisor 62 may be physically present at the data center 100 or may be located remote from the data center 100 while communicating therethrough.

The application center 24, which is in selective and operative communication with the data center 100, is a dedicated facility for addressing specific requests, needs, or the like of the user, the data center 100, or both. In an example, several application centers 24 may be associated with the data center 100, where each application center is designed to address the specific request, need, etc. Examples of the application centers 24 include, but are not limited to, dedicated facilities for managing and handling, respectively, emergency service centers, navigation route centers, transmissions related to the pre-filling data checks, etc. When the application center 24 is a pre-filling data check dedicated center, upon receiving a data communication from the financial institution 122, the switch 68 at the data center 100 routes the data communication to the switchboard 102 at the pre-filling data check application center 24, and then the communication is routed by the switchboard 102 to a processor 108 that will analyze the data in the transmission to generate an authorization or denial of the requested filling event.

As shown in FIG. 1, the application center 24 may include a switchboard 102, databases 106, live and/or automated advisors 104, 104', the processor(s) 108, a server 109, as well as a variety of other telecommunication and computer equipment 110 that is known to those skilled in the art. In some instances, the application center 24 may also include one or more modules (such as a comparison module or a communications module, similar to modules 114 and 116 at the data center 100). In such instances, the modules at the application center 24 may be used to perform the functions described above for the respective modules 114 and 116 at the data center 100. These various application center components are coupled to one another via a network connection or bus 118, such as one similar to the vehicle bus 34 or the data center bus 76 described above.

Switchboard 102, which may be a private branch exchange (PBX) switch, routes incoming signals so that voice transmissions (e.g., voice calls) are usually sent to either the live advisor 104 or the automated response system 104', and data transmissions (e.g., packetized voice communications) are passed on to a modem or other piece of equipment (e.g., a computing device such as processor 108) for demodulation and further signal processing. The modem preferably includes an encoder, as previously explained, and can be connected to various devices, for example, the server 109 and database 106.

The database(s) 106 may be designed to store a variety of information usable by the application center 100. When the application center 100 is a navigation route service center, the database(s) 106 may store various routes and/or points of interest often requested by a particular user. When the application center 100 is a pre-filling data check center, the database(s) 106 may be designed to store the previously described subscriber vehicle record 72 shown in FIG. 2.

Referring back to the general functions of the application center 24, it is to be understood that similar to the data center live advisor 62, the application center live advisor 104 may be physically present at the application center 100 or may be located remote from the application center 24 while communicating therethrough.

The system 10 also includes cellular service provider (not shown) that owns and/or operates the carrier/communication system 16. It is to be understood that, although the cellular service provider (not shown) may be located at the data center 100 or application center 24, both the data center 100 and the application center 24 are separate and distinct entities from the cellular service provider. In an example, the cellular service provider is located remote from the data center 100 and the application center 24. A cellular service provider provides the user with telephone and/or Internet services, while the data center 100 and the application center 24 are telematics service providers. The cellular service provider is generally a wireless carrier (such as, for example, Verizon Wireless®, AT&T®, Sprint®, etc.). It is to be understood that the cellular service provider may interact with the data center 100 and/or the application center 24 to provide various service(s) to the user.

The financial institution 122 includes a processor 124 and other computer equipment 126, a database 128, and a communications module 130 that are equipped with suitable software and/or programs configured to accomplish a variety of functions, including carrying out at least some of the tasks of the method(s) disclosed herein. These various financial institution 122 components are coupled to one another via a network connection or bus 132, such as one similar to the bus 76 of 118. The communications module 130 receives authorization request(s) from the filling station 120 via the communication system 16 or some other communication system 130 between the filling station 120 and the financial institution 122. These requests are data requests which identify the filling station 120 transmitting the request and also include a financial code (e.g., the credit card or debit card number) associated with the card used to initiate the request at the filling station 120. The processor 122 and/or other computer equipment 124 can process the credit or debit card number, and can access the database 128 to identify the vehicle 12 that is associated with or linked to that particular credit or debit card number.

The database 128 stores credit or debit card information (or other suitable financial codes) and associated vehicle information received by the processor 124 from the data center 100. When a user (e.g., a fleet manager) wishes to link a credit or debit card to a specific vehicle 12, he/she contacts the data center 100 (e.g., via the phone, via a telematics service dedicated website, or via any other suitable method) and provides the credit or debit card information for storage in his/her profile. The data center 100 transmits both the card information and the vehicle 12 information to the financial institution 122 that authorizes or denies purchases that are attempted to be made with the particular credit or debit card. The database 128 stores the card and vehicle information in a manner that enables i) a query to be performed using the card information, and ii) the results of the query to provide the vehicle information linked to the card information.

The communications module 130 of the financial institution 122 is also configured to transmit the identified vehicle information along with the filling request to the data center 100 for processing.

As shown in FIG. 1, the system 10 also includes the filling station 120. The filling station 120 may be a fuel dispensing pump or an electricity dispensing device located at a filling service station (which may include multiple stations 120, a convenience store, etc.). The filling station 120 includes a customer interface having a credit or debit card slot 136, a keypad 138, and a display 140. The credit or debit card slot 136 is configured to receive the credit or debit card in a predetermined manner, and is associated with a reader that is configured to read the financial code information contained in the magnetic strip of the card. The keypad 138 may also be used to key in the financial code information. Still further, in some instances, the display 140 may be a touchscreen that allows the user to input the financial code information. In still other instances, the filling station 120 may include an RFID reader that is capable of reading information from a user dedicated RFID device. Regardless of how the information is input, this information is transmitted to the financial institution 122 via one of the communication systems 16 or 134 via a filling station processor (not shown), which is configured with hardware and/or software to transmit and receive data communications to and from the financial institution 122. The filling station processor is also configured to process communications from the financial institution 122, and to reconfigure the filling station 120 operating parameters in accordance with any instructions contained in these communications. In some instances, the filling station processor is also capable of displaying the communication (e.g., an authorization to begin filling or a denial of the filling request) to a user of the filling station 120 via the display 140.

Referring now to FIG. 3, various examples of the method are depicted. Each of the methods shown in this figure begins at step 300 when a user arrives at a filling station 120 and inserts his/her credit or debit or other financial code into the filling station 120 (via slot 136, keypad 138, touchscreen on display 140, etc.). The processor at the filling station 120 receives this financial code information, and generates a filling event request or authorization request to be transmitted to the financial institution 122. The filling event request or authorization request is in the form of a data message, such as a text message, or a short message service (SMS) message, or the like. The request is transmitted from the filling station 120 to the financial institution 122 via any appropriate communication system, such as systems 16 or 134, as shown at reference numeral 302.

The communications module 130 at the financial institution receives the data message via the bus 132, and transmits the message to the processor 124 for processing. In particular, the processor 124 runs a query on the database 128 using the financial code contained in the message as the search term. This query will identify the vehicle 12 that is associated with the financial code received in the request, as shown at reference numeral 304, as long as the financial code and corresponding vehicle 12 had previously been stored in the database 128 (as described in reference to FIG. 1). While not shown in FIG. 3, it is to be understood that when the query does not identify a vehicle 12, the financial institution 122 may authorize or deny the filling event request based upon the financial information associated with the financial code (e.g., credit limit has been reached, funds not available on a debit card, card has been temporarily or permanently deactivated due to fraud, etc.). However, in the example shown in FIG. 3, the query identifies the vehicle 12 by retrieving a vehicle identification number (VIN) and/or a vehicle station identification (STID) that had been linked to the input financial code in the database 128. In one embodiment, it is to be understood that one financial code is associated with (i.e., linked to) one vehicle 12 in the database 128, and thus the query will identify the vehicle 12 alone, and not multiple vehicles. In another embodiment, the financial code is associated with (i.e., linked to) multiple vehicles 12 (e.g., fleet vehicles or one owner's multiple vehicles). In this example, the vehicle 12 is identified because its vehicle identification number (VIN) and/or vehicle station identification (STID) is on a list, in the database 128, of multiple vehicle 12 linked to the input financial code.

While not shown in the drawings, in another embodiment, a query is not run because the vehicle identification number and/or the vehicle station identification (STID) is transmitted with the financial code information. This may be accomplished when a user dedicated RFID device is used at the filling station 120 because the vehicle identifying information may be programmed in the device with the financial code information. This may also be accomplished when the vehicle 12 is capable of communicating with the filling station 120 via short range wireless communication. In this example, the vehicle 12 transmits its identifying information directly to the filling station 120.

The initial filling event request (received from the filling station 120) may also include information that identifies the filling station 120, at least by type (e.g., fuel or charging) and by location (e.g., via an address), and, in some instances, by name (e.g., Gas Station X). The filling station 120 identification information may be stored in a memory of the filling station processor, and is retrieved, upon recognition of an input of financial code information, for inclusion in the data message with the financial code information. In this example, the filling station 120 transmits its own information to the financial institution 122. Alternatively, the filling station 120 information may be stored in a database 128, 72 at the financial institution 122 or the data center 100 and may be retrieved when the position of the vehicle 12 is known (i.e., the position of the vehicle 12 can be used to identify the filling station 120 where the vehicle 12 is located, and then filling station 120 information may be looked up).

The processor 124 at the financial institution 122 is configured to generate a revised filling event/authorization request which includes the request for authorization, the identified VIN and/or vehicle STID, and the filling station identifying information (as shown at reference numeral 306). The communications module 130 then transmits the request to the data center 100. This may be accomplished via a data transmission over the communication system 16.

When the data center 100 receives the revised filling event/authorization request, the processor 84 first reviews the type of filling station 120 that is associated with the request, as shown at reference numeral 312. It is to be understood that the type of filling station 120 transmitting the request will dictate the type of analysis that is performed by the processor 84. More specifically, the processor 84 will search or request and then compare certain vehicle parameters when the filling station 120 is a fuel pump, and will search or request and then compare different vehicle parameters when the filling station 120 is a charge dispenser.

In an example of when the filling station 120 is a fuel pump, the processor 84 will use the vehicle identifier in order to further identify at least one fuel-related parameter of the vehicle 12 (see reference numeral 314). More particularly, the processor 84 may use the vehicle identifier to access the subscriber vehicle profile 71 in the database 72 to determine the fuel tank capacity, a last-recorded level of fuel in the tank, and/or the type of fuel that is suitable for the vehicle 12. It is to be understood that when the date and time stamp of the last-recorded level of fuel in the profile 71 predates the date and time stamp of the revised filling event request by a predetermined threshold (i.e., some preset time period, e.g., 24 hours, 48 hours, etc.), the processor 84 may generate and the communications module 116 may transmit a request to the vehicle data upload system 91 to retrieve and send a then-current reading of the fuel level in the vehicle 12. For example, if the last-recorded level of fuel uploaded to the profile 71 was at 7 am on Apr. 6, 2010, and the revised filling event is being processed at 10 pm on Apr. 9, 2010, the processor 84 will recognize that 3 days have passed since the last-recorded fuel level in the profile 71, and will request a then-current reading from the vehicle 12.

The VDU system 91 will transmit the request to the telematics unit processor 36, which will command the fuel tank sensor(s) to transmit a then-current reading of the level of fuel in the tank. The sensors will receive the command signal, will measure the fuel level, and will transmit the measurement to the processor 36 via the vehicle bus 34. The VDU system 91 will upload the raw data received from the sensor(s) as described hereinabove. When received at the data center 100, the processor 84 will store the raw data in the database 72, thus replacing the previous last-recorded fuel level measurement (i.e., the outdated measurement) with the then-current measurement (i.e., the measurement just received). It is to be understood that the time and date stamp of the received measurement may also be recorded, and thus the then-current measurement becomes the last-recorded fuel level saved in the profile 71. It is to be understood that when the telematics unit 14 is configured to perform a vehicle data upload event regularly (e.g., every 30 minutes, every 60 minutes, or at some other relatively regular time interval that is shorter than the predetermined threshold), then on-demand data uploads from the vehicle 12 may not be needed and the data in the profile 71 may be used.

In one example of the method (as shown at reference numerals 314(I) through 322), when the processor 84 recognizes that the filling station 120 is a fuel pump, the processor 84 may be configured to compare the parameters of the fuel tank capacity and the last-recorded fuel level. As previously mentioned, the information associated with parameters (i.e., the numerical values of the capacity and last-recorded fuel level) may be retrieved from the profile 71 and/or by requesting such information directly from the vehicle 12. The numerical information is transmitted to the comparison module 114, which includes a software routine that compares the fuel tank capacity value with the last-recorded fuel level value, as shown at reference numeral 316. In particular, the comparison module 114 is checking to see if the last-recorded fuel level value is equal to or less than the fuel tank capacity.

When the last-recorded fuel level value is equal to the fuel tank capacity of the vehicle 12, the processor 84 generates a denial that is transmitted to the financial institution 122 and then to the filling station 120 (see reference numeral 320). The last-recorded fuel level value may be equal to the fuel tank capacity when the vehicle 12 has been recently filled, and the vehicle at the filling station 120 is not the vehicle 12 or the user is attempting to fill, e.g., a fuel can. For example, the user may be attempting to use the credit card (e.g., a company card for use with vehicle 12 only) for another of his/her vehicles. In this particular example, upon retrieving the then-current level of fuel from the vehicle 12 or from the profile 71, the comparison module 114 will recognize that the fuel tank is already filled, and thus will command the processor 84 to deny the filling request.

The denial is generally in the form of a data message that can be transmitted wirelessly to the financial institution 122 and the filling station 120, and is configured to be displayed on the display 140 of the filling station 120. Upon receiving the denial message, the filling station 120 disables or maintains the disabled state of the pump. In some instances, the denial data message is also transmitted from the filling station 120 to the vehicle 12 via a short range wireless device (e.g., a smart phone) paired to the telematics unit 14. In other instances, when or after the denial is transmitted to the financial institution 122 and the filling station 120, the denial may also be transmitted directly to the vehicle 12 or an electronic device associated with the vehicle 12 from the data center 100. This may be desirable, for example, when connectivity issues prohibit the filling station 120 from sending the denial message to the vehicle 12. When transmitted directly to the vehicle 12, the denial message may be an SMS (short message service) message or an email that is sent to the vehicle 12 via communication system 16 for display on the vehicle display 80.

When the last-recorded fuel level value is less than the fuel tank capacity of the vehicle 12, the processor 84 generates an authorization that is transmitted to the financial institution 122 and then to the filling station 120 (see reference numeral 322). In one example, the authorization may simply be a data message including an instruction to the financial institution 122 to authorize payment and an instruction to the filling station 120 to render the pump of the station 120 operable. In another example, the authorization is a data message including an instruction to the financial institution 122 to authorize payment and an instruction to the filling station 120 to render the pump of the station 120 operable to dispense a maximum number of gallons, liters, etc., which is based upon the difference between the current fuel level and the fuel tank capacity. For example, when the vehicle's fuel tank capacity is 19 gallons (see, e.g., FIG. 2), and the then-current (or last-recorded) fuel level is 15 gallons (see, e.g., FIG. 2), the authorization data message may include an instruction to the filling station 120 to allow no more than 4 gallons to be dispensed. In such an instance, the filling station 120 will turn itself off after 4 gallons has been dispensed.

In another example of the method (as shown at reference numerals 314(II) through 326), when the processor 84 recognizes that the filling station 120 is a fuel pump, the comparison module 114 may be configured to compare the parameters of fuel type that is suitable for the vehicle 12 with the fuel type that is dispensed by the filling station 120. As previously mentioned, the information associated with the vehicle parameters (i.e., the type of fuel (regular gasoline, diesel fuel, E85 fuel, etc.) may be retrieved from the profile 71. Also as previously mentioned, the information associated with the filling station 120 may be received in both the original and revised filling event requests. Alternatively, the processor 84 at the data center 100 may have to investigate to determine the fuel type of the filling station 120. In one example, the processor 84 may transmit a request to the processor of the filling station 120 asking the filling station 120 to transmit any information associated with the filling station 120 to the data center 100 in real time. In another embodiment, the processor 84 may access the database 72 for information about the filling station 120 that had been previously stored.

The fuel type information is transmitted to the comparison module 114, which includes a software routine that compares the fuel type suitable for the vehicle 12 with the fuel type dispensed by the filling station 120, as shown at reference numeral 324. In particular, the comparison module 114 is checking to see if the fuel types match (i.e., diesel fuel is suitable for the vehicle 12 and diesel fuel is dispensed from the filling station 120).

When the fuel types do not match (e.g., (i.e., regular fuel is suitable for the vehicle 12 and diesel fuel is dispensed from the filling station 120), the processor 84 generates a denial that is transmitted to the financial institution 122 and then to the filling station 120 (see reference numeral 320). In one example, the denial is in the form of a data message that can be transmitted wirelessly to the financial institution 122 and the filling station 120, and is configured to be displayed on the display 140 of the filling station 120. In this example, the denial may inform the user that the fuel type is not proper for his/her vehicle 12. In another embodiment, the data message denial received at the filling station 120 is transmitted to the vehicle 12 via short range wireless communication when the filling station 120 is paired with the vehicle 12. The vehicle 12 may include a text to speech engine (not shown) that converts the data message to a verbal message that is relayed to the user via the in-vehicle audio system 60 or a smart phone paired with the telematics unit 14. As previously mentioned, in another example, the denial message may also be transmitted directly from the data center processor 84 to the financial institution 122 and filling station 120 as well as to the vehicle telematics unit 14 or an electronic device associated with the vehicle 12.

When the fuel types do match, the processor 84 generates an authorization that is transmitted to the financial institution 122 and then to the filling station 120 (see reference numeral 322). In this example, the authorization is a data message including an instruction to the financial institution 122 to authorize payment and an instruction to the filling station 120 to render the pump of the station 120 operable for dispensing the fuel, as shown at reference numeral 326.

Referring back to reference numeral 312, in other examples, the processor 84 at the data center recognizes from the filling event request that the filling station 120 is a charge dispenser. In these examples of the method, the processor 84 will use the vehicle identifier in order to further identify at least one charge-related parameter of the vehicle 12 (see reference numeral 328). More particularly, the processor 84 may use the vehicle identifier to access the subscriber vehicle profile 71 in the database 72 to determine the charge capacity of the battery in the vehicle 12, a last-recorded charge level of the vehicle battery, and/or the type of plugs that the vehicle 12 contains. It is to be understood that when the date and time stamp of the last-recorded charge level in the profile 71 predates the date and time stamp of the revised filling event request by a predetermined threshold (i.e., some preset time period, e.g., 24 hours, 48 hours, etc.), the processor 84 may also transmit a request to the vehicle data upload system 91 to transmit a then-current reading of the charge level in the vehicle 12.

The VDU system 91 will transmit the request to the telematics unit processor 36, which will command the electrical charge sensor(s) to transmit a then-current reading of the level of charge in the battery. The sensors will receive the command signal, will measure the charge level, and will transmit the measurement to the processor 36 via the vehicle bus 34. The VDU system 91 will upload the raw charge data received from the sensor(s) as described hereinabove. The raw data may be stored in the database 72 with a date and time stamp, thus replacing the previous last-recorded charge level and updating the profile 71. As previously mentioned, when the telematics unit 14 is configured to perform a vehicle data upload event regularly (e.g., every 10 minutes, every 15 minutes, or at some other relatively regular time interval that is shorter than the predetermined threshold), then on-demand data uploads from the vehicle 12 may not be needed.

In one example of the method (as shown at reference numerals 328(I) through 334), when the processor 84 recognizes that the filling station 120 is a charge dispenser pump, the processor 84 may be configured to compare the parameters of the charge capacity and the last-recorded charge level. As previously mentioned, the information associated with parameters (i.e., the numerical values of the charge capacity and last-recorded charge level) may be retrieved from the profile 71 and/or by requesting such information directly from the vehicle 12. The numerical information is transmitted to the comparison module 114, which includes a software routine that compares the charge capacity value with the last-recorded charge level value, as shown at reference numeral 330. In particular, the comparison module 114 is checking to see if the last-recorded charge level value is equal to or less than the charge capacity.

When the last-recorded charge level value is equal to the charge capacity of the battery in the vehicle 12, the processor 84 generates a denial that is transmitted to the financial institution 122 and then to the filling station 120 (see reference numeral 332). The last-recorded charge level value may be equal to the charge capacity when the vehicle 12 has been recently charged, and the vehicle at the filling station 120 is not the vehicle 12. For example, the user may be attempting to use the credit card (e.g., a company card for use with vehicle 12 only) for another of his/her vehicles. In this particular example, upon retrieving the then-current charge from the vehicle 12 or from the profile 71, the comparison module 114 will recognize that the battery is already charged, and thus will command the processor 84 to deny the filling request.

In one embodiment, the denial is in the form of a data message that can be transmitted wirelessly to the financial institution 122 and the filling station 120, and is configured to be displayed on the display 140 of the filling station 120. The denial may be transmitted from the filling station 120 to the telematics unit 14 as described herein. In another example, the denial message may also be transmitted directly to the vehicle 12 or an electronic device associated with the vehicle 12 as an SMS message, or an email, or another in-vehicle message via protocol between the telematics unit 14 and the data center 100.

When the last-recorded charge level value is less than the charge capacity of the battery in the vehicle 12, the processor 84 generates an authorization that is transmitted to the financial institution 122 and then to the filling station 120 (see reference numeral 334). In one example, the authorization may simply be a data message including an instruction to the financial institution 122 to authorize payment and an instruction to the filling station 120 to render the outlet of the station 120 operable. In another example, the authorization is a data message including an instruction to the financial institution 122 to authorize payment and an instruction to the filling station 120 to render the outlet of the station 120 operable to dispense a maximum amount of electricity, which is based upon the difference between the current charge level and the charge capacity of the battery. For example, when the vehicle's charge capacity is 16.0 kW h (kilowatt hours), and the then-current (or last-recorded) charge level is 8.2 kW h, the authorization data message may include an instruction to the filling station 120 to allow no more than 7.8 kW h of electricity to be dispensed. In such an instance, the filling station 120 will turn itself off after the 7.8 kW h have been dispensed.

In still another example of the method (as shown at reference numerals 328(II) through 340), when the processor 84 recognizes that the filling station 120 is a charging station, the comparison module 114 may be configured to compare the parameters of electric plugs of the vehicle 12 with the outlets that are available at the filling station 120. As previously mentioned, the information associated with the vehicle parameters (i.e., the type of electric plugs) may be retrieved from the profile 71. Also as previously mentioned, the information associated with the filling station 120 may be received in both the original and revised filling event requests. Alternatively, the processor 84 at the data center 100 may have to investigate to determine the outlets of the filling station 120. In one example, the processor 84 may transmit a request to the processor of the filling station 120 asking the filling station 120 to transmit any information associated with the filling station 120 to the data center 100 in real time. In another embodiment, the processor 84 may access the database 72 for information about the filling station 120 that had been previously stored.

The plug and outlet information is transmitted to the comparison module 114, which includes a software routine that compares the plug type of the vehicle 12 with the outlet type of the filling station 120, as shown at reference numeral 336. In particular, the comparison module 114 is checking to see if the plug(s) is/are compatible with the outlet(s) so that the vehicle 12 may be plugged in and charged.

When the results from the comparison module 114 indicate that the plugs do not match the outlets, the processor 84 generates a denial that is transmitted to the financial institution 122 and then to the filling station 120 (see reference numeral 332). The denial is generally in the form of a data message that can be transmitted wirelessly to the financial institution 122 and the filling station 120, and is configured to be displayed on the display 140 of the filling station 120. In this example, the denial may inform the user that the plug is not compatible with his/her vehicle 12.

When the plug and outlets do match, the processor 84 generates an authorization that is transmitted to the financial institution 122 and then to the filling station 120 (see reference numeral 340). In this example, the authorization is a data message including an instruction to the financial institution 122 to authorize payment and an instruction to the filling station 120 to render the outlets of the station 120 operable for dispensing electricity.

Figure 4:
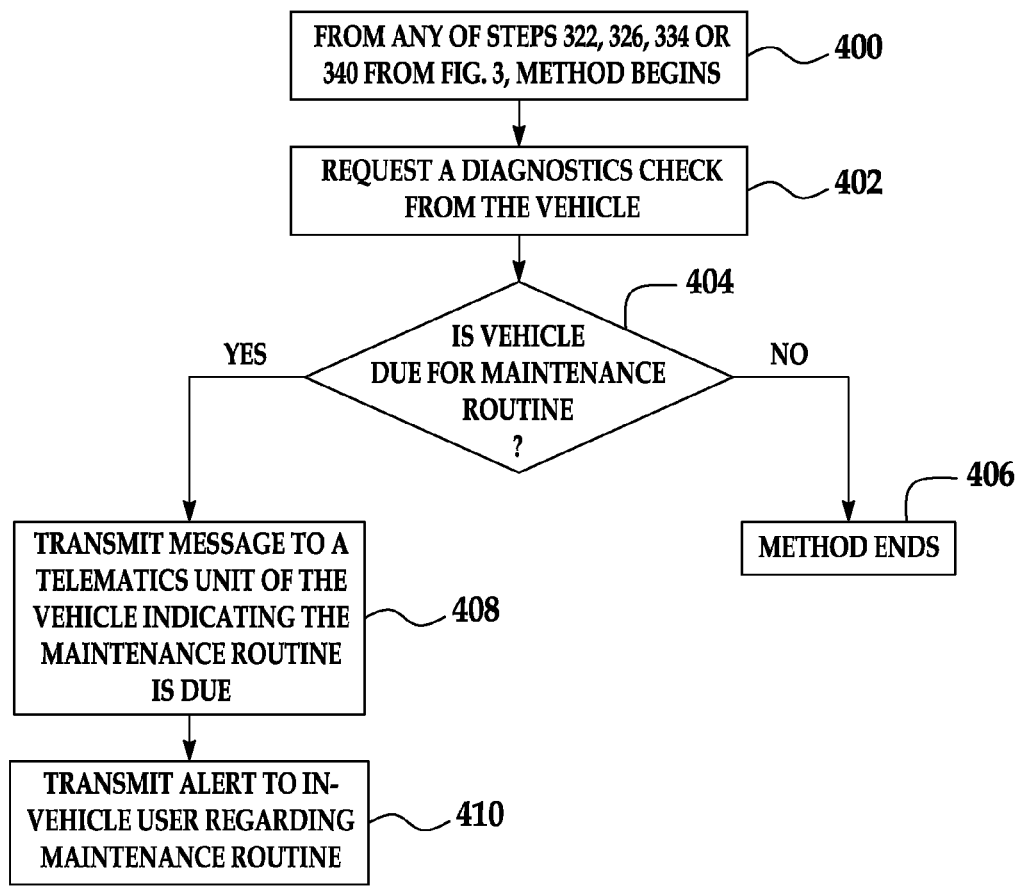
FIG. 4 is a flow diagram including additional steps that may be performed with some of the examples of the method shown in FIG. 3.

In any of the examples disclosed in FIG. 3 that result in an authorization being transmitted to the filling station 120, it is to be understood that the methods may continue as shown in FIG. 4 (beginning at reference numeral 400). Since the vehicle 12 is at a filling station 120, and presumably will remain there for a filling event, the example of the method shown in FIG. 4 may be performed to alert the vehicle user if one or more maintenance routines are required. This example will now be described in more detail. After an authorization is transmitted, the data center 100, via the communications module 116, may transmit a diagnostics check request to the vehicle 12, as shown at reference numeral 402. This request may be generated by the processor 84 and transmitted directly to the vehicle 12 by the communications module 116. This request may command the vehicle data upload system 91 to retrieve and send the results of a complete diagnostics check of the various vehicle systems (e.g., oil level, tire pressures, wiper fluid level, etc.).

The VDU system 91 will transmit the request to the telematics unit processor 36, which will command the various sensor(s) 64 throughout the vehicle 12 to transmit then-current measurements associated with the respective sensor(s).

The sensors 64 will each receive a command signal, will take an appropriate measurement, and will transmit the measurement to the processor 36 via the vehicle bus 34. The VDU system 91 will upload the raw data received from the sensor(s) 64 as described hereinabove. When received at the data center 100, the processor 84 will analyze the data to determine if the vehicle 12 is due for a maintenance routine, as shown at reference numeral 404. The determination of whether a maintenance routine is due will depend upon the raw data that is received and the standards (e.g., minimum level) for the vehicle system associated with the raw data. As one example, if the PSI of the front driver's side tire is 32, and the raw data from the diagnostics check indicates the then-current level is 32 PSI, the processor 84 may determine that a tire pressure maintenance routine is not needed. When the processor 84 analyzes all of the received data and determines that no maintenance routines are due, the method ends, as shown at reference numeral 406. As another example, if the PSI of the front driver's side tire is 32, and the raw data from the diagnostics check indicates the then-current level is 30 PSI, the processor 84 may determine that a tire pressure maintenance routine should be performed. Similar determinations may be made for each of the diagnostic measurements received. When the processor 84 analyzes all of the received data and determines that one or more maintenance routines are due, a data message is generated and transmitted to the telematics unit 14, as shown at reference numeral 408.

The maintenance routine data message may be generated by the processor 84 and transmitted via the communications module 116. The maintenance routine data message includes instructions for the telematics unit 14 to generate an alert for an in-vehicle user upon recognizing a vehicle ignition on event or a powering up event of the telematics unit 14. When the telematics unit 14 and/or vehicle 12 is powered on, the telematics unit processor 14 will transmit the alert to the in-vehicle user via a visible and/or audible alert (see reference numeral 410). The visible alert may be a message displayed on the display 80, and the audible alert may be a pre-set recording or a verbal message transmitted from the data center 100 that is played through the audio system 60 and announces the maintenance routine that is due. For example, a message on the display 80 may read "Tire Maintenance Due on Driver's Side Front Tire", or the audible recording may recite a similar announcement. The user may respond to the messages or ignore the messages. The telematics unit 14 may be programmed to repeat the alerts for a predetermined time, and the user may override this setting by pressing an end button or by reciting a verbal command, such as "end".

Figure 5:
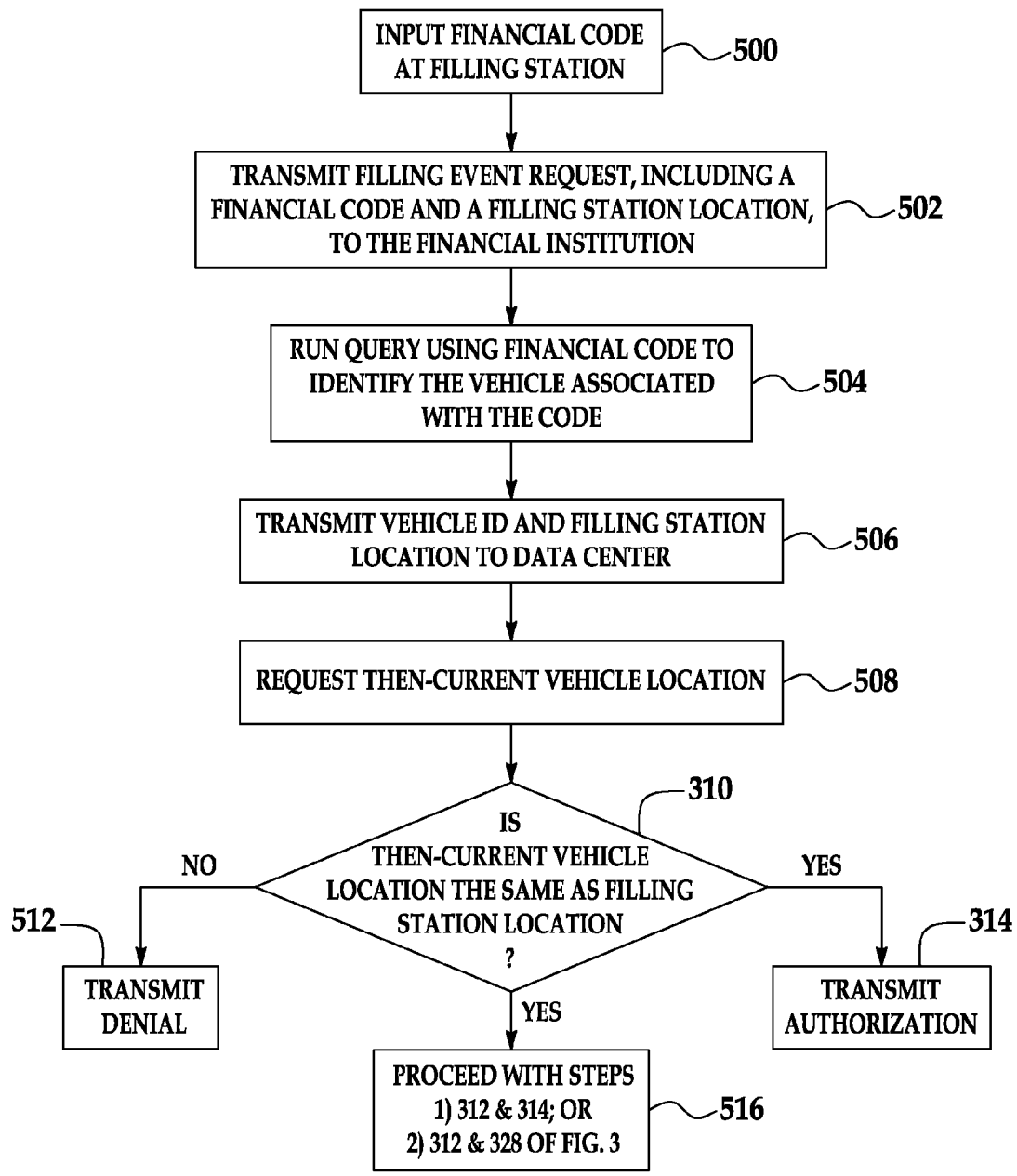
FIG. 5 is a flow diagram depicting another example of the method for performing the pre-filling data check that may be performed alone or in conjunction with the examples of the method outlined in FIG. 3.

Referring now to FIG. 5, the data center 100 may request the then-current location of the vehicle 12 to verify that the vehicle 12 associated with the financial code input at the filling station 120 is actually present at the filling station 120. It is to be understood that while this example is shown in FIG. 5, this particular method may be incorporated with any of the examples disclosed herein. Similar to the methods discussed in reference to FIG. 3, this method begins when the financial code information is input into the filling station 120 (see reference numeral 500). As shown at reference numeral 502, the processor at the filling station 120 receives this request (which includes the financial code information and filling station identification information), and generates the filling event request or authorization request and transmits the filling event request or authorization request to the financial institution 122. The communications module 130 at the financial institution receives the data message via the bus 132, and transmits the message to the processor 124 for processing. In particular, and as shown at reference numeral 504, the processor 124 runs a query on the database 128 using the financial code contained in the message as the search term in order to identify the vehicle 12 that is associated with the financial code received in the request.

The processor 124 at the financial institution 122 is configured to generate a revised filling event/authorization request which includes the request for authorization, the identified VIN and/or vehicle STID, and the filling station identifying information; and then transmit the revised request to the data center 100 (as shown at reference numeral 508).

When the data center 100 receives the revised filling event/authorization request, the processor 84 transmits a request to the vehicle data upload system 91 to transmit the then-current location vehicle 12 to the data center 100. The VDU system 91 will transmit the request to the telematics unit processor 36, which will command the location detection chipset/component 44 to transmit the then-current location of the vehicle 12. The location detection chipset/component 44 will receive the command signal, will identify the position (e.g., latitude and longitude) of the vehicle 12, and will transmit the position/location to the processor 36 via the vehicle bus 34. The VDU system 91 will upload (as described hereinabove) the raw position data received from the location detection chipset/component 44. The raw data may be processed by a geocoder (not shown) in operative communication with the processor 84. The geocoder runs a reverse geocoding process to identify the street address that corresponds with the position data.

When the street address at which the vehicle 12 is actually located does not correspond with the street address of the filling station 120 from which the filling event request was initiated, a denial of the filling event will be transmitted to the filling station 120, as shown at reference numeral 512. This data indicates that the user of the financial code is not attempting to fill the registered vehicle 12, but rather is attempting an unauthorized use of the financial code. In this event, an registered owner of the vehicle 12 may be contacted to inform him/her that someone is attempting to use his/her financial code in an unauthorized manner. In this event, a fleet manager may alternatively or also be contacted to inform him/her that an attempt has been made to utilize a financial code that is associated with one of his/her fleet vehicles 12 in an unauthorized manner.

When the street address at which the vehicle 12 is actually located does correspond with the street address of the filling station 120 from which the filling event request was initiated, an authorization of the filling event may be transmitted to the filling station 120. As shown at reference numeral 514, in some instances the authorization is simply a data message including an instruction to the financial institution 122 to authorize payment and an instruction to the filling station 120 to render the pump of the station 120 operable.

In other examples of when the street address at which the vehicle 12 is actually located does correspond with the street address of the filling station 120 from which the filling event request was initiated, the method may continue along any route shown in FIG. 3, starting at reference numeral 312.

It is to be understood that in any of the examples disclosed herein, the financial institution can deny authorization of the filling event even if the data center 100 transmits an authorization. This may occur when the financial code indicates that the maximum limit has been reached, when a fleet owner/manager puts a hold on the account, when suspicious card activity is recognized, or the like.

While a single filling station 120 and a single financial institution 122 are shown and described in the examples herein, it is to be understood that any number of filling stations 120 and financial institutions 122 may participate in the method and may be part of the system 10 disclosed herein.

Furthermore, while the examples disclosed herein discuss the authorization request being received directly at the filling station 120 (e.g., fuel pump or electricity dispenser), it is to be understood that the request may be received via computer equipment located within a building associated with the filling service station, where the computer equipment operates as the filling station processor and is remotely and operatively connected to the filling station 120 user interface.

While several examples have been described in detail, it will be apparent to those skilled in the art that the disclosed examples may be modified. Therefore, the foregoing description is to be considered exemplary rather than limiting.

The invention claimed is:

1. A pre-filling vehicle data check method, comprising:
receiving, at a financial institution, an authorization request from a filling station for initiating a filling event, the authorization request including a financial code and filling station identification information;
recognizing, via a computing device at the financial institution, that the financial code is associated with at least one of a vehicle identification number or a station identification associated with a vehicle, thereby identifying the vehicle;
transmitting, from the computing device at the financial institution, a revised authorization request to a computing device at a data center in selective communication with the vehicle and the financial institution, the revised authorization request including the at least one of the vehicle identification number or the station identification and the filling station identification information;
identifying a parameter of the vehicle via the computing device at the data center, the parameter being a fuel-related parameter when the filling station identification information indicates that the filling station is a fuel pump and the parameter being a charge-related parameter when the filling station identification information indicates that the filling station is a charge dispenser;
comparing the parameter with i) an other parameter of the vehicle, or ii) a parameter of the filling station; and
transmitting, from the computing device at the data center, an authorization or denial of the filling event based at least upon the comparison.

2. The method as defined in claim 1 wherein identifying the parameter includes at least one of i) searching a data center profile associated with the vehicle or ii) requesting, via the data center, then-current information from the vehicle.

3. The method as defined in claim 1 wherein:
the fuel-related parameter is a fuel tank capacity, and the other parameter of the vehicle is a last-recorded level of fuel; or
the fuel-related parameter is a type of fuel that is suitable for the vehicle, and the parameter of the filling station is a type of fuel that is dispensed by the filling station; or
the charge-related parameter is a charge capacity of a battery in the vehicle, and the other parameter of the vehicle is a last-recorded charge level of the battery; or
the charge-related parameter is electric plugs of the vehicle and the parameter of the filling station is outlets that are available at the filling station.

4. The method as defined in claim 1, further comprising:
requesting, from the data center to the vehicle, a diagnostics check;
determining from the diagnostics check that the vehicle is due for a maintenance routine; and
transmitting a message to a telematics unit associated with the vehicle, the message indicating that the maintenance routine is due.

5. The method as defined in claim 4 wherein the maintenance routine is selected from an oil change, a tire pressure check, a wiper fluid check, the oil change and the tire pressure check, the oil change and the wiper fluid check, the tire pressure check and the wiper fluid check, or the oil change, the tire pressure check and the wiper fluid check.

6. The method as defined in claim 1, further comprising:
identifying, at the data center, a location of the filling station;
requesting, from the data center to the vehicle, a then-current location of the vehicle;
transmitting the then-current location from the vehicle to the data center; and
using the then-current location of the vehicle to determine whether the vehicle is located at the filling station from which the authorization request was received.

7. The method as defined in claim 6, further comprising:
determining that the then-current location of the vehicle does not correspond with the location of the filling station; and
transmitting the denial for the filling event.

8. The method as defined in claim 6, further comprising:
determining that the then-current location of the vehicle does correspond with the location of the filling station; and
transmitting the authorization for the filling event when the comparison of the parameters also indicates that the authorization should be transmitted.

9. A pre-filling vehicle data check method, comprising:
receiving, at a financial institution, an authorization request from a filling station for initiating a filling event, the authorization request including a financial code;
recognizing, via a computing device at the financial institution, that the financial code is associated with at least one of a vehicle identification number or a station identification associated with a vehicle, thereby identifying the vehicle;
identifying the filling station as a fuel filling station;
identifying at least one parameter of the vehicle via a computing device at a data center in selective communication with the vehicle and the financial institution, the identifying of the at least one parameter being accomplished by at least one of i) searching a data center profile associated with the vehicle or ii) requesting, via the data center, then-current information from the vehicle, and the identifying of the at least one parameter including:
determining a fuel tank capacity of the vehicle by retrieving fuel tank capacity information from the data center profile; and
determining a current fuel level of the vehicle by requesting and receiving current fuel level information from the vehicle;
comparing, at the data center, the fuel tank capacity of the vehicle with the current fuel level of the vehicle; and
transmitting, from the data center to the filling station via the financial institution, an authorization for the filling event including instructions for the filling station to allow a maximum amount to be dispensed that is equal to a difference between the current fuel level and the fuel tank capacity when the current fuel level is below the fuel tank capacity.

10. A pre-filling vehicle data check method, comprising:
receiving, at a financial institution, an authorization request from a filling station for initiating a filling event, the authorization request including a financial code;
recognizing, via a computing device at the financial institution, that the financial code is associated with at least one of a vehicle identification number or a station identification associated with a vehicle, thereby identifying the vehicle;
identifying the filling station as a particular type of fuel station;
identifying at least one parameter of the vehicle via a computing device at a data center in selective communication with the vehicle and the financial institution, the identifying of the at least one parameter being accomplished by at least one of i) searching a data center profile associated with the vehicle or ii) requesting, via the data center, then-current information from the vehicle, and the identifying of the at least one parameter including identifying a type of fuel used by the vehicle by retrieving fuel type information from the data center profile;
determining whether the type of fuel used by the vehicle matches the particular type of fuel station; and
when a match is determined, transmitting an authorization for the filling event; or
when a match is not determined, transmitting a denial for the filling event.

11. A pre-filling vehicle data check method, comprising:
receiving, at a financial institution, an authorization request from a filling station for initiating a filling event, the authorization request including a financial code;
recognizing, via a computing device at the financial institution, that the financial code is associated with at least one of a vehicle identification number or a station identification associated with a vehicle, thereby identifying the vehicle;
identifying the filling station as a charging station;
identifying at least one parameter of the vehicle via a computing device at a data center in selective communication with the vehicle and the financial institution, the identifying of the at least one parameter being accomplished by at least one of i) searching a data center profile associated with the vehicle or ii) requesting, via the data center, then-current information from the vehicle, and the identifying of the at least one parameter including:
determining a charge capacity of the vehicle by retrieving charge capacity information from the data center profile; and
determining a current charge level of the vehicle by requesting and receiving current charge level information from the vehicle;
comparing, at the data center, the charge capacity of the vehicle with the current charge level of the vehicle; and
transmitting, from the data center to the charging station via the financial institution, an authorization for the filling event including instructions for the charging station to allow a maximum amount to be dispensed that is equal to a difference between the current charge level and the charge capacity when the current charge level is below the charge capacity.

12. A pre-filling vehicle data check method, comprising:
receiving, at a financial institution, an authorization request from a filling station for initiating a filling event, the authorization request including a financial code;
recognizing, via a computing device at the financial institution, that the financial code is associated with at least one of a vehicle identification number or a station identification associated with a vehicle, thereby identifying the vehicle;
identifying the filling station as a charging station;
identifying at least one parameter of the vehicle via a computing device at a data center in selective communication with the vehicle and the financial institution, the identifying of the at least one parameter being accomplished by at least one of i) searching a data center profile associated with the vehicle or ii) requesting, via the data center, then-current information from the vehicle, and the identifying of the at least one parameter including identifying electrical plugs of the vehicle by retrieving electrical plugs information from the data center profile;
determining whether the electrical plugs of the vehicle match an outlet of the charging station; and
when a match is determined, transmitting an authorization for the filling event; or
when a match is not determined, transmitting a denial for the filling event.

13. A system for performing a pre-filling vehicle data check, comprising:
a vehicle having an identification number and a financial code associated therewith;
a financial institution configured to receive an authorization request for initiating a filling event, the authorization request including the financial code and filling station identification information;
a computing device at the financial institution configured to identify the vehicle; and
a data center in selective communication with the financial institution and the vehicle, the data center including:
a database configured to store a data center profile associated with the vehicle;
a communications module configured to establish communication with a telematics unit of the vehicle to retrieve data from the vehicle;
a processor configured to:
receive a revised authorization request from the computing device at the financial institution, the revised authorization request including the vehicle identification number and the filling station identification information; and
identify, using the database or the vehicle, a fuel-related parameter of the vehicle when the filling station identification information identifies a fuel filling station or a charge-related parameter of the vehicle when the filling station identification information identifies a charging station; and
a comparison module to compare the fuel-related parameter or the charge-related parameter with i) another parameter of the vehicle or ii) a parameter of the fuel filling station or the charging station;
wherein the processor is further configured to generate an authorization or denial of the filling event based at least upon the comparison.

14. The system as defined in claim 13 wherein the processor is configured to identify the fuel-related parameter or the charge-related parameter by at least one of i) searching the data center profile or ii) requesting, via the communications module, then-current information from the vehicle.

15. The system as defined in claim 13, further comprising the fuel filling station or the charging station in operative communication with the financial institution, the fuel filling station or the charging station including at least one of a reader configured to read the financial code from a magnetic strip, a keypad configured to receive the financial code from a user of the filling station, a touchscreen configured to receive the financial code from the user of the fuel filling station or the charging station, or an RFID reader configured to read information from an RFID device.

16. The system as defined in claim 13 wherein the fuel filling station is in operative communication with the financial institution, wherein the fuel-related parameter is a fuel tank capacity of the vehicle, wherein the other parameter of the vehicle is a current fuel level of the vehicle, and wherein the processor of the data center is further configured to:
   determine the fuel tank capacity of the vehicle by instructing the database to retrieve fuel tank capacity information from the data center profile;
   determine the current fuel level of the vehicle by instructing the communications module to request current fuel level information from the vehicle;
   compare, via the comparison module associated therewith, the fuel tank capacity of the vehicle with the current fuel level of the vehicle; and
   transmit, to the fuel filling station through the financial institution, the authorization for the filling event including instructions for the fuel filling station to allow a maximum amount to be dispensed that is equal to a difference between the current fuel level and the fuel tank capacity when the current fuel level is below the fuel tank capacity.

17. The system as defined in claim 13 wherein the fuel filling station is a particular type of fuel station in operative communication with the financial institution, wherein the fuel-related parameter is a type of fuel used by the vehicle, wherein the parameter of the fuel filling station is the particular type of fuel station, and wherein the processor of the data center is further configured to:
   identify the type of fuel used by the vehicle by instructing the database to retrieve fuel type information from the data center profile;
   determine, via the comparison module, whether the type of fuel used by the vehicle matches the particular type of fuel station; and
   when a match is determined, transmit, to the fuel filling station through the financial institution, the authorization for the filling event; or
   when a match is not determined, transmit, to the fuel filling station through the financial institution, the denial for the filling event.

18. The system as defined in claim 13 wherein the charging station is in operative communication with the financial institution, wherein the charge-related parameter is a charge capacity of the vehicle, wherein the other parameter of the vehicle is a current charge level of the vehicle, and wherein the processor of the data center is further configured to:
   determine the charge capacity of the vehicle by instructing the database to retrieve charge capacity information from the data center profile;
   determine the current charge level of the vehicle by instructing the communications module to request current charge level information from the vehicle;
   compare, via the comparison module associated therewith, the charge capacity of the vehicle with the current charge level of the vehicle; and
   transmit, to the charging station through the financial institution, the authorization for the filling event including instructions for the charging station to allow a maximum amount to be dispensed that is equal to a difference between the current charge level and the charge capacity when the current charge level is below the charge capacity.

19. The system as defined in claim 13 wherein the charging station is in operative communication with the financial institution, wherein the charge-related parameter is electrical plugs of the vehicle, wherein the parameter of the charging station is an outlet of the charging station, and wherein the processor of the data center is further configured to:
   identify the electrical plugs of the vehicle by instructing the database to retrieve electrical plug information from the data center profile;
   determine whether the electrical plugs of the vehicle match the outlet of the charging station; and
   when a match is determined, transmit, to the charging station through the financial institution, the authorization for the filling event; or
   when a match is not determined, transmit, to the charging station through the financial institution, the denial for the filling event.

20. The system as defined in claim 13, further comprising a location detection system operatively connected to the telematics unit of the vehicle and configured to supply a then-current location of the vehicle upon request from the data center; and wherein the data center is further configured to, via the comparison module, determine whether the vehicle is located at the fuel filling station or the charging station from which the authorization request was received.

* * * * *